(12) United States Patent
Kanzaki et al.

(10) Patent No.: US 6,518,363 B2
(45) Date of Patent: Feb. 11, 2003

(54) POLYPROPYLENE RESIN COMPOSITION

(75) Inventors: Susumu Kanzaki, Kisarazu (JP);
Moriyasu Shimojo, Ichihara (JP);
Mitsuji Tsuji, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/891,455

(22) Filed: Jun. 27, 2001

(65) Prior Publication Data

US 2002/0035209 A1 Mar. 21, 2002

(30) Foreign Application Priority Data

Jun. 30, 2000 (JP) ........................................ 2000-198925

(51) Int. Cl.$^7$ ............................ C08L 23/10; C08L 23/16
(52) U.S. Cl. ...................................................... 525/240
(58) Field of Search ........................................ 525/240

(56) References Cited

U.S. PATENT DOCUMENTS

| | | | | |
|---|---|---|---|---|
| 5,556,910 A | * | 9/1996 | Harada et al. | ............... 524/504 |
| 5,852,100 A | * | 12/1998 | Sadatoshi et al. | ........... 524/505 |
| 6,306,972 B1 | * | 10/2001 | Ohkawa et al. | ............. 524/451 |

FOREIGN PATENT DOCUMENTS

| | | |
|---|---|---|
| EP | 0 661 341 A1 | 7/1995 |
| JP | 7-157626 | 6/1995 |
| JP | 7-157627 | 6/1995 |
| JP | 7-233305 | 9/1995 |
| JP | 7-286075 | 10/1995 |

\* cited by examiner

*Primary Examiner*—Nathan M. Nutter
(74) *Attorney, Agent, or Firm*—Sughrue Mion, PLLC

(57) ABSTRACT

A polypropylene resin composition comprising:

95 to 80% by weight of a polypropylene resin (A) consisting of a propylene-ethylene block copolymer (i) composed of a propylene homopolymer portion having an intrinsic viscosity $[\eta]^A_P$ of not more than 1.3 dl/g, and a propylene-ethylene random copolymer portion having an intrinsic viscosity $[\eta]^A_{EP}$ of not more than 3.0 dl/g, or a mixture (ii) of the propylene-ethylene block copolymer (i) and a propylene homopolymer; and 5 to 20% by weight of a propylene-ethylene block copolymer (B) having a propylene-ethylene random copolymer portion having an intrinsic viscosity $[\eta]^B_{EP}$ of from 8.0 to 15 dl/g, wherein the polypropylene resin composition has a melt flow rate (MFR) of from 5.0 to 150 g/10 min. and the sum of the (A) and (B) is 100% by weight.

9 Claims, No Drawings

POLYPROPYLENE RESIN COMPOSITION

BACKGROUND OF THE INVENTION

1. Field of the Invention

The present invention relates to a polypropylene resin composition containing two kinds of specified propylene-ethylene block copolymers having mutually different structures. More particularly, it relates to a polypropylene resin composition providing a molded article excellent in appearance when formed into a molded article because few flow marks are generated. For example, the die swell is high and few fish eyes are generated. Further, the present invention relates to a molded article made of the polypropylene resin composition.

2. Description of Related Arts

Polypropylene resin compositions are materials excellent in rigidity, impact resistance, and the like and they have been used widely as molded articles such as automobile internal and external trim materials, electrical parts housings, and the like. It is well known that, among these polypropylene resin compositions, a polypropylene resin composition containing propylene-ethylene block copolymers, for example, a polypropylene resin composition containing a propylene-ethylene block copolymer and a propylene homopolymer, or different two kinds of propylene-ethylene block copolymers is preferably used because of its excellent rigidity, impact resistance, and the like.

For example, JP 07-157626A discloses a thermoplastic resin composition containing a propylene-ethylene block copolymer obtained by multi-stage polymerization and a polyolefin rubber. The propylene-ethylene block copolymer is composed of a propylene-ethylene block copolymer in which the ethylene content of a propylene-ethylene random copolymer phase is from 5 to 50% by weight and the intrinsic viscosity of the copolymer phase is from 4.0 to 8.0 dl/g, and a propylene-ethylene block copolymer in which the ethylene content of a propylene-ethylene random copolymer phase is more than 50% by weight to 98% by weight and an intrinsic viscosity of the copolymer phase is 2.0 to less than 4.0 dl/g. Further, it is disclosed that the thermoplastic resin composition having an extremely large ductility can be obtained.

JP 07-157627A discloses a thermoplastic resin composition containing a propylene-ethylene block copolymer obtained by multistage polymerization and a polyolefin rubber. The propylene-ethylene block copolymer is composed of a propylene-ethylene block copolymer in which the intrinsic viscosity of a propylene-ethylene random copolymer phase is from 4.0 to 8.0 dl/g, and a propylene-ethylene block copolymer in which the intrinsic viscosity of a propylene-ethylene random copolymer phase is 2.0 to less than 4.0 dl/g excluding the propylene-ethylene block copolymer of JP 07-157626A. Further, it also discloses that the thermoplastic resin composition having a extremely large ductility can be obtained.

Moreover, JP 07-233305A discloses a polypropylene resin composition improved in flowability, containing a polypropylene, an inorganic filler, and a metallic soap composed of a fatty acid of 15 to 20 carbon atoms and zinc, and having an improved flowability. As the polypropylene, a block copolymer containing a propylene-ethylene copolymer portion having an [η] of 2 to 6 dl/g and having an [η] of 7 to 15 dl/g is disclosed. As the preferred embodiment, it discloses the composition composed of at least two kinds of block copolymers. And, it discloses that there can be obtained a polypropylene resin composition having, in practical use, no problem of reduction of impact strength, rigidity, heat resistance, and the like, and being suitable for manufacturing a thin-walled molded article because of its improved flowability.

Incidentally, in recent years, a propylene-ethylene block copolymer, which is preferably used because of its excellent rigidity, impact resistance, and the like, has become manufactured by a continuous gas phase process whereby the manufacturing step is simple, and manufacturing can be performed at a low cost. However, in general, the propylene-ethylene block copolymer manufactured by the gas phase process has the following problems. If the intrinsic viscosity of the propylene-ethylene random copolymer portion is set high, granular structures generate, whereby the appearance of the molded article becomes poor.

As a method for solving such a problem of the appearance, for example, JP 07-286075A discloses a propylene polymer composition which comprises a propylene polymer manufactured by a continuous polymerization method, wherein the propylene polymer has a content of a 23° C. n-decane soluble component of from 0 to less than 15% by weight. The 23° C. n-decane soluble component contains a structural unit derived from ethylene in an amount of from 30 to 60 mol % and has an intrinsic viscosity [η] of from 3 to 7.5 dl/g, and a propylene block copolymer produced by a batch-wise or continuous solvent polymerization method, wherein the propylene block copolymer has a content of a 23° C. n-decane soluble component of from 15 to 40% by weight. The 23° C. n-decane soluble component contains a structural unit derived from ethylene in an amount of from 30 to 60 mol % and has an intrinsic viscosity [η] of from 5 to 12 dl/g. It also discloses that the propylene polymer composition is obtainable that is excellent in rigidity and impact resistance, and is capable of being formed into a molded article without generating granular structures on its surface.

However, it has been desired to develop a polypropylene resin composition without generating flow marks on its surface when formed into a molded article. In other words, it is desired to improve appearance, and ensure practical use even when granular structures are generated.

SUMMARY OF THE INVENTION

An object of the present invention is to provide a polypropylene resin composition providing a molded article excellent in appearance when formed into a molded article, i.e., having few flow marks. In other words, die swell is high and few fish eyes are generated.

Further, another object of the present invention is to provide a molded article made of a polypropylene resin composition.

In view of the present situation, the present inventors as a result of intensive study, have found that a polypropylene resin composition obtained by using two kinds of specific propylene-ethylene block copolymers which are mutually different in structure, can solve the foregoing problems. Thus, they have completed the present invention.

Namely, the present invention relates to a polypropylene resin composition comprising:

(A) 95 to 80% by weight of a polypropylene resin selected from the group consisting of a propylene-ethylene block copolymer (i) having a propylene homopolymer portion and propylene-ethylene random copolymer portion, and (ii) a mixture of the propylene-ethylene block copolymer (i) and a propylene homopolymer, wherein an intrinsic viscosity $[\eta]^A{}_P$ of the propylene homopolymer portion when the resin (A) is the copolymer (i), or of the total of the propylene homopolymer portion and the propylene homopolymer when the resin (A) is the mixture (ii) is not more than 1.3 dl/g, and an intrinsic viscosity $[\eta]^A{}_{EP}$ of the propylene-ethylene random copolymer portion is not more than 3.0 dl/g; and (B) 5 to 20% by weight of a propylene-ethylene block copolymer composed of a propylene homopolymer portion and propylene-ethylene random copolymer portion wherein an intrinsic viscosity $[\eta]^B{}_{EP}$ of the propylene-ethylene random copolymer is 8.0 to 15 dl/g, and wherein the polypropylene resin composition has a melt flow rate (MFR) of from 5.0 to 150 g/10 min., and the sum of the (A) and (B) is 100% by weight.

Below, the present invention will be described in detail.

DETAILED DESCRIPTION OF THE INVENTION

The propylene-ethylene block copolymer (i) used in the present invention is a propylene-ethylene block copolymer having a propylene homopolymer portion (hereinafter, sometimes referred to as "first segment of the copolymer (i)"), and a propylene-ethylene random copolymer portion (hereinafter, sometimes referred to as "second segment of the copolymer (i)"). Further, two or more kinds of propylene-ethylene block copolymers satisfying the above-conditions of the copolymer (i) may also be used.

The mixture (ii) is a mixture of the propylene-ethylene block copolymer (i) and a propylene homopolymer. Further, the mixture may be formed by using two or more kinds of propylene-ethylene block copolymers and two or more kinds of propylene homopolymers.

The polypropylene resin (A) used in the present invention is selected from the propylene-ethylene block copolymer (i) having a propylene homopolymer portion and a propylene-ethylene random copolymer portion, or a mixture (ii) of the propylene-ethylene block copolymer (i) and a propylene homopolymer. Herein, the propylene homopolymer portion of the polypropylene resin (A) denotes the propylene homopolymer portion which is the first segment of the propylene-ethylene block copolymer (i) when the resin (A) is the block copolymer (i), and the total of the propylene homopolymer portion which is the first segment of the propylene-ethylene block copolymer (i) and the propylene homopolymer when the resin (A) is the mixture (ii).

The intrinsic viscosity of $[\eta]^A{}_P$ of the propylene homopolymer portion of the polypropylene resin (A) is not more than 1.3 1/g, and preferably from 0.7 to 1.3 dl/g. If the $[\eta]^A{}_P$ exceeds 1.3 d/l, the melt flow rate (MFR) of the polypropylene resin composition may be reduced, depending on the composition and conditions resulting in a reduction in flowability.

Herein, when the resin (A) is the mixture (ii) of the copolymer (i) and the propylene homopolymer, the intrinsic viscosity of $[\eta]^A{}_P$ refers to the viscosity of a mixture of the propylene homopolymer portion of the copolymer (i) and the propylene homopolymer. It is possible to determine the intrinsic viscosity $[\eta]^A{}_P$ of the propylene homopolymer portion by using the intrinsic viscosity of the propylene homopolymer portion which is the first segment of the propylene-ethylene block copolymer (i), the intrinsic viscosity of the propylene homopolymer, and the mixing ratio thereof because the additive property holds for the intrinsic viscosity in the mixture.

The isotactic pentad fraction of the propylene homopolymer portion of the copolymer (i) and the propylene copolymer in the polypropylene resin (A), determined by $^{13}$C-NMR is preferably not less than 0.95, and more preferably not less than 0.97 from the viewpoints of rigidity, heat resistance, and the like.

The intrinsic viscosity $[\eta]^A{}_{EP}$ of the propylene-ethylene random copolymer portion of the copolymer (i) is not more than 3.0 dl/gl, and preferably from 1.5 to 3.0 dl/g. If the intrinsic viscosity $[\eta]^A{}_{EP}$ exceeds 3.0 dl/g, a large number of granular structures may be generated in the molded product.

The aforementioned granular structure is an agglomerate product mainly composed of a propylene-ethylene random copolymer component occurring due to the low dispersibility of the propylene-ethylene random copolymer portion of the polypropylene resin (A), and it has a size of from about 100 to several hundred micrometers. When a molded product is formed with injection molding, or the like, by using a material in which a large number of granular structures are present, not only is the appearance of the molded product surface damaged, but also the mechanical properties such as the impact resistance performance are adversely affected.

Further, the ethylene content $[(C2')_{EP}]$ of the propylene-ethylene random copolymer portion in the polypropylene resin (A) is preferably from 20 to 60% by weight, and more preferably from 25 to 55% by weight from the viewpoint of the impact resistance.

From the viewpoints of impact resistance, rigidity, heat resistance, and the like, the respective proportions of the propylene-ethylene random copolymer portion of the polypropylene resin (A) and the propylene homopolymer portion of the polypropylene resin (A) are as follows: preferably, the proportion of the propylene-ethylene random copolymer portion of the polypropylene resin (A) is 5 to 30% by weight, more preferably 7 to 20% by weight, and the proportion of the propylene homopolymer portion in the copolymer (i) when the resin (A) is the copolymer (i), or of the total of the homopolymer portion of the copolymer (i) and the propylene homopolymer when the polypropylene resin (A) is the mixture(ii), is from 95 to 70% by weight, more preferably 93 to 80% by weight. The sum of the propylene homopolymer portion(i) or of the total of the homopolymer portion of the copolymer (i) and the propylene homopolymer, and the propylene-ethylene random copolymer portion is 100% by weight.

The manufacturing method of the propylene-ethylene block copolymer (i) and propylene homopolymer in the propylene resin (A) used in the present invention has no particular restriction. However, the invention can be preferably produced by a known polymerization method with a catalyst system formed from (a) a solid catalyst component containing magnesium, titanium, halogen and an electron donor as essential components, (b) an organoaluminum compound, and (c) an electron donor component, for example, a catalyst system described in U.S. Pat. Nos. 4,983,561, 5,608,018, or 6,187,883, or the like, adjusting polymerization conditions so that the resin can be produced.

From the industrial and economical viewpoints (viewpoint of simplicity of the steps), the polymerization form is preferably a continuous gas phase polymerization.

The propylene-ethylene block copolymer (B) used in the present invention is a propylene-ethylene block copolymer composed of a propylene homopolymer portion (hereinafter, referred to as "first segment of the copolymer (B)") and a propylene-ethylene random copolymer portion (hereinafter, referred to as "second segment of the copolymer (B)").

The intrinsic viscosity $[\eta]^B_P$ of the propylene homopolymer portion which is the first segment of the copolymer (B) is preferably not more than 1.3 dl/g, and more preferably not more than 1.1 dl/g from the viewpoints of the flowability of the polypropylene resin composition.

The isotactic pentad fraction of the propylene homopolymer portion which is the first segment of the copolymer (B), determined by $^{13}$C-NMR is preferably not less than 0.95, and more preferably not less than 0.97 from the viewpoints of rigidity, heat resistance, and the like.

The intrinsic viscosity $[\eta]^B_{EP}$ of the propylene-ethylene random copolymer portion which is the second segment of the copolymer (B) is from 8.0 to 15 dl/g, and preferably from 9.0 to 13 dl/g. If the $[\eta]^B_{EP}$ is less than 8.0 dl/g, the die swell may be insufficient, so that the flow marks may generate. Whereas if it exceeds 15.0 dl/g, a large number of granular structures may occur, or the MFR of the polypropylene resin composition may be reduced, resulting in a reduced flowability.

The aforementioned granular structure is the same one as the granular structure in the polypropylene resin (A).

The ethylene content [(C2')$_{EP}$] of the propylene-ethylene random copolymer which is the second segment of the copolymer (B) is preferably from 20 to 60% by weight from the viewpoint of impact resistance.

From the viewpoints of impact resistance, die swell, and flow mark of the molded article, and the MFR and flowability of the polyolefin resin composition, the respective proportions of the propylene-ethylene random copolymer portion which is the second segment of the copolymer (B), and the propylene homopolymer portion which is the first segment of the copolymer (B) are as follows: the proportion of the second segment of the copolymer (B) is preferably from 10 to 40% by weight, and preferably 15 to 35% by weight, and the proportion of the first segment of the copolymer (B) is preferably from 90 to 60% by weight, and preferably 85 to 65% by weight.

Although the manufacturing method of the propylene-ethylene block copolymer (B) used in the present invention has no particular restriction, it is preferably to apply to a similar method with the aforementioned method of the propylene-ethylene block copolymer (i) in the resin (A) except adjusting polymerization conditions to obtain the polypropylene-ethylene block copolymer (B). As the polymerization method, a batch-wise polymerization method is preferred from the viewpoint of less generation of granular structures.

The mixing ratios of the polypropylene resin (A) and the polypropylene resin (B) used in the present invention are from 95 to 80% by weight, preferably from 95 to 90% by weight, more preferably from 95 to 91% by weight, and 5 to 20% by weight, preferably from 5 to 10% by weight, more preferably from 5 to 9% by weight, respectively. Herein, the sum of the resins (A) and (B) is 100% by weight. When the mixing ratio of the polypropylene resin (A) exceeds 95% by weight, the die swell is reduced, so that the flow mark may become likely to occur, or the impact resistance of the molded product may be insufficient. Whereas, when it is less than 80% by weight, a large number of granular structures may occur, and the MFR of the polypropylene resin composition may be reduced, resulting in a reduction in flowability.

The polypropylene resin composition of the present invention comprises the polypropylene resin (A) and the propylene-ethylene block copolymer (B). The melt flow rate (MFR) thereof is from 5.0 to 150 g/10 min, and preferably from 10 to 120 g/10 min. When the melt flow rate (MFR) of the polypropylene resin composition of the present invention is from 5.0 to 150 g/10 min, a large molded article is easy to form. However, when it is less than 5.0 g/10 min, the moldability may be deteriorated, or flow marks may be generated. Whereas, when it exceeds 150 g/10 min, the impact resistance may be reduced.

The die swell of the polypropylene resin composition of the present invention is preferably not less than 1.6. When the die swell is less than 1.6, the flow marks of the molded article surface may unsatisfactorily increase.

As the manufacturing method of the polypropylene resin composition of the present invention, a method using a kneading machine such as a single screw extruder, twin screw extruder, Banbury mixer, hot roller or the like, is preferred. For example, methods shown below can be used.

(1) A method in which respective polymer powders of the polypropylene resin (A) and the propylene-ethylene block copolymer (B) are kneaded by using the aforesaid kneading machine.

(2) A method in which the polymer powder of the polypropylene resin (A) and the polymer powder of the propylene-ethylene block copolymer (B) are individually kneaded by using a single screw or twin screw extruder to prepare their respective pellets, and thereafter, the pellet of the polypropylene resin (A) and the pellet of the propylene-ethylene block copolymer (B) are kneaded by using a single screw or twin screw extruder.

(3) A method in which the propylene-ethylene block copolymer (B) previously pelletized by using a single screw or twin screw extruder is added to the kneading machine by using a constant amount feeder in the process of pelletizing the polymer powder of the polypropylene resin (A), and the mixture is kneaded.

Preferred is the method using the pellet of the propylene-ethylene block copolymer (B) previously kneaded by using a single screw or twin screw extruder of the aforesaid method (2) or (3).

Further, if required, a screen pack may also be mounted in a die of the single screw or twin screw extruder. As the screen pack to be mounted, preferred is a metal fiber sintered filter, which is, for example, described in "Machine Design (1981, March issue, vol.25, No.3, 109–113)".

The kneading temperature is generally from 170 to 250° C., and preferably from 190 to 230° C.

Various additives may also be added to the polypropylene resin composition of the present invention as far as its purpose and effect are not damaged. Examples of the additives include antioxidants, UV absorbers, slipping agents, pigments, antistatic agents, copper harm inhibitors, flame retardants, neutralizing agents, foaming agents, plasticizers, nucleating agents, bubble inhibitors, and crosslinking agents. Among these additives, it is preferable that antioxidants and UV absorbers are added thereto for improving the heat resistance, weather resistance, and antioxidation stability. Further, the rubber components, various inorganic and organic fillers may also added thereto in such a range that the object and effect of the present invention are not damaged.

These additives, rubber components, fillers, and the like may be previously mixed with the polypropylene resin (A), the propylene-ethylene block copolymer (B), or both of them, and thereafter, the polypropylene resin composition is prepared. Alternatively, they may also be mixed therewith in the kneading stage of the polypropylene resin (A) and the propylene-ethylene block copolymer (B).

The polypropylene resin composition of the present invention can be molded into an injection-molded article by a generally known injection molding. Particularly, it is preferably used as an injection-molded article for an automobile, and preferably used as, for example, a door-trim, a pillar, an instrumental panel, a bumper, or the like.

EXAMPLES

The present invention will be described by way of examples below, but is not limited thereto.

The measuring methods of the physical properties of the polymers and compositions used in examples and comparative examples are shown below.

(1) Intrinsic Viscosity (unit: dl/g)

The reduced viscosities were measured at three concentrations of 0.1, 0.2, and 0.5 g/dl by using an Ubbellohde viscometer. The intrinsic viscosity was determined by a calculation method described in "Polymer Solution, Polymer Experiment, Vol. 11" (published by Kyoritsu Shuppan Co., Ltd, 1982), page 491, i.e. an extrapolation method of plotting the reduced viscosities to the concentrations, then extrapolating the viscosity at a concentration of zero. The measurements were carried out at a temperature of 135° C. by using tetralin as a solvent.

(1-1) Intrinsic Viscosities of Propylene-ethylene Block Copolymers (i) and (B).

(1-1a) Intrinsic Viscosity of Propylene Homopolymer Portion (Each First Segment of Copolymers (i) and (B): $[\eta]_P$.

The intrinsic viscosity $[\eta]_P$ of the propylene homopolymer portion which is each first segment of the propylene-ethylene block copolymers (i) and (B) was determined in the following manner. At the time of manufacturing thereof, the propylene homopolymer was sampled from a polymerization reactor after the polymerization of the propylene homopolymer, i.e., the first step, and the $[\eta]_P$ of the propylene homopolymer taken out was determined.

(1-1b) Intrinsic Viscosity of Propylene-ethylene Random Copolymer Portion (Each Second Segment of Copolymers (i) and (B)): $[\eta]_{EP}$.

The intrinsic viscosity $[\eta]_{EP}$ of the propylene-ethylene random copolymer portion which is the second segment of the propylene-ethylene block copolymers (i) and (B) was determined in the following manner. The intrinsic viscosity $[\eta]_P$ of the propylene homopolymer portion, and the intrinsic viscosity $[\eta]_T$ of the total propylene-ethylene block copolymers were determined, respectively. Then, the intrinsic viscosity $[\eta]_{EP}$ was determined by calculation from the following formulae by using the weight ratio: X of the propylene-ethylene random copolymer portion to the total propylene-ethylene block copolymers. (The weight ratio X based on the total weight of the propylene-ethylene block copolymers was determined from the following measuring method (2)):

$[\eta]_{EP} = [\eta]_T / X - (1/X - 1)[\eta]_P$;

$[\eta]_P$: intrinsic viscosity (dl/g) of propylene homopolymer portion;

$[\eta]_T$: intrinsic viscosity (dl/g) of total propylene-ethylene block copolymers;

(1-2) Intrinsic Viscosity of Propylene Homopolymer: $[\eta]_P$

The intrinsic viscosity $[\eta]_P$ of the propylene homopolymer used in the mixture (ii) was determined by using a propylene homopolymer in accordance with the aforesaid method (1).

(2) Weight Ratio of Propylene-ethylene Random Copolymer Portion to Total Propylene-ethylene Block Copolymers: X, and Ethylene Content of Propylene-ethylene Random Copolymer Portion in Propylene-ethylene Block Copolymer: $(C2')_{EP}$.

It was determined from $^{13}$C-NMR spectrum measured under the following conditions based on the report by Kakugo et al., (Macromolecules 1982, 15, 1150–1152).

A sample was prepared by homogeneously dissolving about 200 mg of a propylene-ethylene block copolymer in 3 ml of orthodichlorobenzene in a 10-mmΦ test tube. Then, the $^{13}$C-NMR spectrum was determined under the following conditions:

Measuring temperature: 135° C.

Pulse repeating time: 10 seconds

Pulse width: 45°

Integrating times: 2500

(3) Isotactic Pentad Fraction

The isotactic pentad fraction is a fraction of propylene monomer unit existing at the center of the isotactic chain in the form of a pentad unit, in other words, the chain in which five propylene monomer units are successively meso-bonded, in the polypropylene molecular chain as measured by the method disclosed by A. Zambelli et al. in Macromolecules, 6, 925 (1973), namely by use of $^{13}$C-NMR. However, the assignment of NMR absorption peak was determined according to the method described in Macromolecules, 8, 687 (1975) published thereafter.

Specifically, the isotactic pentad fraction was measured as an area fraction of mmmm peak in the total absorption peaks in the methyl carbon region of $^{13}$C-NMR spectrum. When the isotactic pentad fraction of NPL standard substance CRM No. M19-14 Polypropylene PP/MWD/2 of NATIONAL PHYSICAL LABORATORY in U.K. was measured by this method, it was 0.944.

(4) Melt Flow Rate (MFR) (Unit: g/10 min.)

It was determined in accordance with the method specified in JIS-K-6758. Unless otherwise stated, the measurement was carried out at a temperature of 230° C. under a load of 2.16 kg.

(5) Die Swell

It was determined by using Capillograph 1B manufactured by Toyo Precision Instrument Co., Ltd., under the following conditions:

Measuring Temperature: 220° C.

L/D: 40

Shear rate: $2.432 \times 10^3$ sec$^{-1}$ (6) Number of Granular Structures (number thereof/100 cm$^2$)

The film formed by using a T-die extruder under the following conditions was subjected to quantitative analysis by using an image analysis apparatus in the following manner.

Film Forming Conditions

A film having a width of 50 mm and a thickness of 50 microns was prepared by means of an extruder V-20 manufactured by Tanabe Plastic Machine Co., Ltd., and a film drawing apparatus.

Quantitative Analysis Method

The image of the film (900 dpi, 8 bit) was captured in a computer by means of a scanner GT-9600 manufactured by EPSON Co., and the image was subjected to binarization by an image analysis software "A-ZOUKUN" manufactured by Asahi Engineering Co. The granular structure was recognized as a brighter area than its perimeter. The shape of the granular structure is amorphous, and therefore the number of granular structures having a diameter of not less than 200 microns per 100 cm² of the film was determined, assuming that the diameter of a circle with the same area as that of the granular structure was the size of the granular structure.

The synthesis methods of two kinds of solid catalyst components I and II used in the examples and comparative examples are shown below.

(1) Solid Catalyst Component I (1-i) Synthesis of Reduced Solid Product

The atmosphere in a 500 ml flask equipped with a stirrer and a dropping funnel was replaced with argon, and then 290 ml of hexane, 9.3 ml (9.3 g, 27 mmol) of tetrabutoxytitanium, 8.5 ml (8.8 g, 32 mmol) of diisobutyl phthalate, and 79.1 ml (74.4 g, 357 mmol) of tetraethoxysilane were charged therein to obtain a homogeneous solution. Subsequently, while the temperature in the flask was kept at 6° C., 199 ml of a di-n-butyl ether solution of n-butylmagnesium chloride (manufactured by Yukigosei Yakuhin K.K., concentration of n-butylmagnesium chloride: 2.1 mmol/ml) was gradually added dropwise from the dropping funnel over 5 hours.

After completion of the dropwise addition, the solution was stirred at room temperature for an additional one hour. Thereafter, the solution was subjected to solid-liquid separation at room temperature to obtain a solid, and the solid was washed three times with 300 ml of hexane, and three times with 300 ml of toluene. Then, 270 ml of toluene was added thereto.

A part of the solid product slurry was sampled for composition analysis. As a result, it was indicated that the solid product contained 1.8% by weight of titanium atom, 0.5% by weight of phthalate, 30.7% by weight of ethoxy group and 3.3% by weight of butoxy group. Further, the slurry concentration was 0.140 g/ml.

(1-ii) Synthesis of Solid Catalyst Component

The atmosphere in a 200 ml flask equipped with a stirrer, a dropping funnel, and a thermometer was replaced with argon. Then, 84 ml of the solid product-containing slurry obtained in the step (1-i) was charged therein, and further, 12.1 ml of the supernatant was taken therefrom. Then, 7.8 ml (29 mmol) of diisobutyl phthalate was added thereto, and the reaction was carried out at 95° C. for 30 minutes. After the reaction, the reaction product was subjected to solid-liquid separation to obtain a solid, and the solid was washed twice with 59 ml of toluene.

After completion of washing, 15.3 ml of toluene, 0.66 ml (2.5 mmol) of diisobutyl phthalate, 1.2 ml (6.9 mmol) of butyl ether, and 23.4 (0.213 mole) of titanium tetrachloride were then added in the flask, and the reaction carried out at 95° C. for 3 hours. After completion of the reaction, the reaction product was subjected to solid-liquid separation at the same temperature to a solid, and then the solid was washed twice with 59 ml of toluene at the same temperature. Next, 12.0 ml of toluene, 1.2 ml (6.9 mmol) of butyl ether, and 11.7 ml (0.106 mol) of titanium tetrachloride were added thereto, and the reaction proceeded at 95° C. for one hour. After completion of the reaction, the reaction product was subjected to solid-liquid separation at the same temperature, then washed three times with 59 ml of toluene at the same temperature, and another three times with 59 ml of hexane, and dried under reduced pressure to obtain 8.1 g of a solid catalyst component. The resulting solid catalyst component contained 1.4% by weight of titanium atom, 10.0% by weight of phthalate, 0.5% by weight of ethoxy group, and 0.1% by weight of butoxy group. Further, the solid catalyst component was observed with a stereoscopic microscope, and showed favorable particle properties free from fine powder. The solid catalyst component is referred to as "solid catalyst component I" hereinafter.

(2) Solid Catalyst Component II (2-i) Synthesis of Reduced Solid Product

The atmosphere in a 500 ml flask equipped with a stirrer and a dropping funnel was replaced with nitrogen, and then 290 ml of hexane, 8.9 ml (8.9 g, 26.1 mmol) of tetrabutoxytitanium, 3.1 ml (3.3 g, 11.8 mmol) of diisobutyl phthalate, and 87.4 ml (81.6 g, 392 mmol) of tetraethoxysilane were charged therein to form a homogeneous solution. Then, while the temperature in the flask was kept at 6° C., 199 ml of a di-n-butyl ether solution of n-butylmagnesium chloride (manufactured by Yukigosei Yakuhin K.K., concentration of n-butylmagnesium chloride: 2.1 mmol/ml) was gradually added dropwise from the dropping funnel over 5 hours. After completion of the dropwise addition, the solution was further stirred at 6° C. for one hour, and then stirred at room temperature for an additional one hour. Thereafter, the solution was subjected to solid-liquid separation to obtain a solid, and the solid was washed three times with 260 ml of toluene. Then, an appropriate amount of toluene was added thereto to obtain a solid product slurry of concentration of 0.176 g/ml. A part of the solid product slurry was sampled for composition analysis. As a result, it was indicated that the solid product contained 1.96% by weight of titanium atom, 0.12% by weight of phthalate, 37.2% by weight of ethoxy group, and 2.8% by weight of butoxy group. (2-ii) Synthesis of Solid Catalyst Component The atmosphere in a 100 ml flask, equipped with a stirrer, a dropping funnel, and a thermometer, was replaced with nitrogen. Then, 52 ml of the solid product-containing slurry obtained in the step (2-ii) was charged therein, and 25.5 ml of the supernatant was taken therefrom. Then, a mixture of 0.80 ml (6.45 mmol) of butyl ether and 16.0 ml (0.146 mol) of titanium tetrachloride was added thereto, and then 1.6 ml (11.1 mmol: 0.20 ml/g solid product) was added thereto. The mixture was heated up to 115° C., and stirred for 3 hours as it was. After completion of the reaction, the reaction product was subjected to solid-liquid separation at the same temperature, and washed twice with 40 ml of toluene at the same temperature. Then, a mixture of 10.0 ml of toluene, 0.45 ml (1.68 mmol) of diisobutyl phthalate, 0.80 ml (6.45 mmol) of butyl ether, and 8.0 (0.073 mol) of titanium tetrachloride was added therein for 1-hour treatment at 115° C. After completion of the reaction, the reaction product was subjected to solid-liquid separation at the same temperature, and then the resulting solid was washed three times with 40 ml of toluene at the same temperature, and then washed three times with 40 ml of hexane. Then, the washed product was dried under reduced pressure to obtain 7.36 g of a solid catalyst component. The resulting solid catalyst component contained 2.18% by weight of titanium atom, 11.37% by weight of phthalate, 0.3% by weight of ethoxy group, and 0.1% by weight of butoxy group. Further, the solid catalyst component was observed with a stereoscopic microscope, and showed favorable particle properties free from fine powder. The solid catalyst component is referred as "solid catalyst component II" hereinafter.

Production of Propylene Homopolymer (HPP)

Production of HPP-1

(1) Preliminary Polymerization

In an autoclave equipped with a stirrer, in sufficiently dehydrated and deaerated hexane, 25 mmol/L of triethylaluminium (below, abbreviated as "TEA") and cyclohexylethyldimethoxysilane (below, abbreviated as "CHEDMS") as an electron donor component were charged such that CHEDMS/TEA becomes 0.1 (mol/mol), and the solid catalyst component I was charged such that a final amount of the polymer based on the amount of the solid catalyst component (below, abbreviated as PP/cat) becomes 2.5 (g/g). While maintaining it at low temperatures, propylene was continuously fed therein to obtain a preliminary polymer slurry. The preliminary polymer slurry thus obtained was transferred to another autoclave equipped with a stirrer, and then sufficiently purified liquid butane was added thereto. The mixture was preserved while being kept at a temperature of not more than 10° C.

(2) Main Polymerization

Under such conditions that the concentrations of propylene and hydrogen in the gas phase part were kept at 80% by volume and 7.0% by volume, respectively, at a reactor inner temperature of 80° C. and a reactor inner pressure of 1.8 MPa, continuous gas phase polymerization was carried out by using the preliminary polymer slurry manufactured in (1) above as a solid catalyst component while feeding TEA and CHEDMS thereto. Respective catalyst components were fed such that the concentrations in the polymers obtained were as follows: [TEA]=348 ppm, [CHEDMS]=63 ppm, and PP/cat=17000 (g/g), respectively. The average residence time was 3.0 hr. The analysis results of the polymer obtained are shown in Table 1.

The polymer obtained had an intrinsic viscosity $[\eta]_P$ of 0.90 dl/g, and an isotactic pentad fraction of 0.97.

Production of HPP-2

A powder of HPP-2 having the physical properties shown in Table 1 was obtained in the same manner as with HPP-1, except that the gas composition of the gas phase part and the amount of the catalyst component to be fed were changed in the main polymerization. The analysis results of the polymer obtained are shown in Table 1. The polymer obtained had an intrinsic viscosity $[\eta]_P$ of 0.84 dl/g.

Production of HPP-3

A powder of HPP-3 having physical properties shown in Table 1 was obtained in the same manner as with HPP-1, except that the number of reactors was changed from 1 to 3, and the gas composition of the gas phase part and the amount of the catalyst component to be fed were changed in the main polymerization. The analysis results of the polymer obtained are shown in Table 1. The polymer obtained had an intrinsic viscosity $[\eta]_P$ of 0.92 dl/g.

Production of HPP-4

Preliminary polymerization was carried out in the same manner as in HPP-1, except that the solid catalyst component I was changed to II, and the electron donative component was changed to tert-butyl-n-propyldimethoxysilane (below, abbreviated as "tBnPDMS").

A powder of HPP-4 having physical properties shown in Table 1 was obtained in the same manner as in production of HPP-1 by main polymerization, except that the number of reactors was changed from 1 to 3, the electron donor component was changed to tBnPDMS, the temperature was set at 82° C., and the gas composition of the gas phase part and the amount of the catalyst component to be fed were changed in the main polymerization. The analysis results of the polymer obtained are shown in Table 1. The polymer obtained had an intrinsic viscosity $[\eta]_P$ of 0.76 dl/g, and an isotactic pentad fraction of 0.99.

Production of Propylene-ethylene Block Copolymer (BCPP)

Production of BCPP-1

(1) Preliminary Polymerization: it Was Carried Out in the Same Manner as in Production of HPP-1.

(2) Main Polymerization

Two polymerization vessels were arranged in series. After polymerization of the propylene homopolymer portion (the first segment of the copolymer (i) or (B)), the product was transferred to the next polymerization vessel, and subsequently the polymerization of the propylene-ethylene random copolymer portion (the second segment of the copolymer (i) or (B)) was carried out continuously in the polymerization vessel by a gas phase method.

In the first vessel, under such conditions that the concentrations of propylene and hydrogen in the gas phase part were kept at 80% by volume and 7.4% by volume, respectively, at a reactor inner temperature of 80° and a reactor inner pressure of 1.8 MPa, continuous gas phase polymerization was carried out by using the preliminary polymer slurry manufactured in (1) as a solid catalyst component while feeding TEA and CHEDMS. Respective catalyst components were fed such that the concentrations in the polymers obtained were as follows: [TEA]=201 ppm, [CHEDMS]=36 ppm, and PP/cat=23000 (g/g), respectively. The average residence time was 4.3 hr. The polymer obtained had an intrinsic viscosity $[\eta]_P$ of 0.90 dl/g. In the second vessel, under such conditions that the concentrations of propylene, ethylene, and hydrogen in the gas phase part were kept at 76.1% by volume, 17.2% by volume, and 4.1% by volume, respectively, at a reactor inner temperature of 65° C. and a reactor inner pressure of 1.4 MPa, a gas phase polymerization was carried out continuously. Respective catalyst components were fed such that the concentrations in the polymers obtained were as follows: [TEA]=167 ppm, [CHEDMS]=234 ppm, and PP/cat=4500 (g/g), respectively. The average residence time was 2.0 hr. The analysis results of the polymer obtained are shown in Table 1. The total polymers obtained had an intrinsic viscosity $[\eta]_T$ of 1.07 dl/g, and an EP content of 17% by weight, and the ethylene content of EP was 40% by weight. Therefore, the intrinsic viscosity $[\eta]_{EP}$ of the EP portion was 1.9 dl/g.

Production of BCPP-2 to BCPP-6

Powders of BCPP-2 to BCPP-6 having the physical properties shown in Table 1 were obtained in the same manner as with BCPP-1, except that the gas composition of the gas phase part and the amount of the catalyst component fed were changed in the main polymerization.

Production of BCPP-7

A SUS reactor having an inner volume of 5.5 m³ equipped with a stirrer and a jacket was sufficiently purged with propylene, and then charged with 2.5 m³ of n-heptane, 8.95 mol of [TEA], and 2.64 mol of [tBnPDMS]. Furthermore, the inner temperature was adjusted to 30 to 50° C., and the pressure to 0.15 to 0.25 MPaG with propylene. Then, 0.15 kg of the solid catalyst component II obtained in the same manner as described above was fed thereto. Subsequently, warm water was passed through the jacket to elevate the inner temperature of the reactor to 75° C., and thereafter, the reaction pressure was elevated to 0.8 MPaG with propylene and hydrogen, to start polymerization. Propylene was continuously fed so that the reaction pressure was kept at 0.8 MPaG at a reaction temperature of 75° C., and the polymerization of a polypropylene homopolymer portion (below, abbreviated as "P portion") was continued while the feeding was conducted so that the hydrogen concentration in the gas phase part was kept at 15% by volume. When the integrated amount of propylene fed reached 880 kg, the feeding of propylene and hydrogen was stopped, and the unreacted monomer in the reactor was subjected to degassing to reduce the inner pressure of the reactor down to 0.5 MPaG, while adjusting the inner temperature of the reactor to 60° C. About 100 g of the polymer of the P portion was sampled, and analyzed. As a result, the intrinsic viscosity $[\eta]_P$ was 0.91 dl/g.

Subsequently, the reaction pressure was elevated up to 0.3 MPaG with propylene, and decreased down to 0.05 MPaG. This cycle was repeated 3 times. Then, the reaction pressure was elevated to 0.3 MPaG with propylene and ethylene to start the polymerization of the propylene-ethylene random copolymer portion (below, abbreviated as "EP portion"), and then a mixed gas of propylene/ethylene=3/1 (weight ratio) was continuously fed so that the reaction pressure was kept at 3 MPaG at a reaction temperature of 60° C., and the polymerization of the EP portion was continued. When the integrated amount of the propylene/ethylene mixed gas fed reached 268 kg, the feeding of the monomers was stopped, and the entire amount of the polymer slurry in the reactor was introduced into a deactivating tank to be subjected to a deactivation treatment with butyl alcohol. Then, the polymer slurry was centrifuged to recover a solid polymer which was then dried by a dryer to obtain a powdery white powder. The analysis results of the polymer obtained are shown in Table 1. The intrinsic viscosity $[\eta]_T$ of the total polymers obtained was 3.57 dl/g.

Production of BCPP-8 and BCPP-9

Powders of BCPP-8 and BCPP-9 having the physical properties shown in Table 1 were obtained in the same manner as with BCPP-1, except that the gas composition of the gas phase part and the amount of the catalyst component to be fed were adjusted in the main polymerization The $[\eta]_P$, $[\eta]_{EP}$, the ethylene content of EP, and the EP content are the analysis values of the powders of the propylene homopolymers (HPP-1 to HPP-4) and the propylene-ethylene block copolymers (BCPP-1 to BCPP-9) obtained from the above-described polymerization. Each MFR is the MFR of the pellet pelletized by adding, as stabilizers, 0.05 parts by weight of calcium stearate (manufactured by NOF Corp.), 0.05 parts by weight of 3,9-bis[2-{3-(3-t-butyl-4-hydroxy-5-methylphenyl)propionyloxy}-1,1-diemthylethyl]-2,4,8,10-tetraoxaspiro[5.5]undecane (Sumilizer GA80, manufactured by Sumitomo Chemical Co., Ltd.), and 0.05 parts by weight of bis(2,4-di-t-butylphenyl)pentaerythritol diphosphite (Ultranox U626, manufactured by GE Specialty Chemicals., Co.) to every 100 parts by weight of the powder by using a 40-mm Φ single screw extruder (220° C., screen pack: 100 mesh). Whereas, the number of granular structures (>200 μm) is the number of granular structures having a size of not less than 200 μm, observed per 100 cm² of a film obtained by processing the pellet by using a 20-mm Φ T-die extruder.

Example 1

To 100 parts by weight of a resin composition composed of a mixture (ii) of 33 parts by weight of the propylene homopolymer powder (HPP-1) and 61 parts by weight of the propylene-ethylene block copolymer (i) powder (BCPP-1), and 6 parts by weight of the propylene-ethylene block copolymer (B) powder (BCPP-7), were added, as stabilizers, 0.05 parts by weight of calcium stearate (manufactured by NOF Corp.), 0.05 parts by weight of 3,9-bis[2-{3-(3-t-butyl-4-hydroxy-5-methylphenyl)propionyloxy}-1,1-diemthylethyl]-2,4,8,10-tetraoxaspiro[5.5]undecane (Sumilizer GA80, manufactured by Sumitomo Chemical Co., Ltd.), and 0.05 parts by weight of bis(2,4-di-t-butylphenyl)pentaetythritol diphosphite (Ultranox U626, manufactured by GE Specialty Chemicals., Co.), and the mixture was dry-blended. Then, pelletization was carried out by means of a 40-mm Φ single screw extruder (220° C., screen pack: metal fiber sintered filter NF13D manufactured by Nippon Seisen K.K.) to obtain a polypropylene resin composition. The MFR was 62 g/10 min, the processed film had less granular structures, and the die swell determined at 220° C., an L/D of orifice of 40, and a shear rate of 2.432×10³ sec⁻¹ was high as 1.81.

Examples 2 to 5

Table 2 shows mixing ratios of respective components, and evaluation results of MFR, die swell, and number of granular structures having a size of not less than 200 μm, observed per 100 cm² of film of each polypropylene resin composition obtained by conducting dry-blending and then pelletization in the same manner as in Example 1.

Comparative Examples 1 to 3

Table 2 shows mixing ratios of respective components, and the evaluation results of MFR, die swell, and number of granular structures having a size of not less than 200 μm, observed per 100 cm² of film of each polypropylene resin composition obtained by conducting dry-blending and then pelletization in the same manner as in Example 1.

The results indicates as follows. For Comparative Example 1, since the intrinsic viscosity $[\eta]^A_{EP}$ of the propylene-ethylene random copolymer portion of the polypropylene resin (A) does not satisfy the requirements of the present invention, the number of granular structures is large. For Comparative Example 2, since the intrinsic viscosity $[\eta]^B_{EP}$ of the propylene-ethylene random copolymer portion of the propylene-ethylene block copolymer (B) does not satisfy the requirements of the present invention, the die swell is insufficient. For Comparative Example 3, since the mixing ratios of the polypropylene resin (A) and the propylene-ethylene block copolymer (B) do not satisfy the requirements of the present invention, the number of granular structures is large.

TABLE 1

| | $[\eta]_P$ dl/g | $[\eta]_{EP}$ dl/g | Ethylene content of EP wt % | EP content wt % | MFR g/10 min | Number of granular structures Number thereof/ 100 cm² |
|---|---|---|---|---|---|---|
| Propylene homo-Polymer | | | | | | |
| HPP-1 | 0.90 | — | — | — | 140 | — |
| HPP-2 | 0.84 | — | — | — | 195 | — |
| HPP-3 | 0.92 | — | — | — | 120 | — |
| HPP-4 | 0.76 | — | — | — | 330 | — |
| Ethylene-propylene block copolymer | | | | | | |
| BCPP-1 | 0.90 | 1.9 | 40 | 17 | 68 | 29 |

TABLE 1-continued

| | $[\eta]_P$ dl/g | $[\eta]_{EP}$ dl/g | Ethylene content of EP wt % | EP content wt % | MFR g/10 min | Number of granular structures Number thereof/ 100 cm² |
|---|---|---|---|---|---|---|
| BCPP-2 | 0.92 | 2.5 | 55 | 13 | 64 | 68 |
| BCPP-3 | 0.82 | 1.7 | 43 | 12 | 132 | 19 |
| BCPP-4 | 0.81 | 2.1 | 57 | 12 | 132 | 77 |
| BCPP-5 | 0.95 | 6.1 | 49 | 17 | 29 | 2309 |
| BCPP-6 | 0.84 | 2.5 | 60 | 13 | 106 | — |
| BCPP-7 | 0.91 | 11 | 23 | 27 | 3.0 | 10 |
| BCPP-8 | 1.2 | 3.4 | 25 | 37 | 4.4 | 821 |
| BCPP-9 | 1.1 | 8.0 | 61 | 12 | 33 | 2500 or more |

TABLE 2

| | Example 1 | Example 2 | Example 3 | Example 4 | Example 5 |
|---|---|---|---|---|---|
| Composition (wt %) | | | | | |
| (A) | | | | | |
| HPP-1 | 33 | 33 | | 32 | |
| HPP-2 | | | 33 | | |
| HPP-3 | | | | | 29 |
| BCPP-1 | 61 | | | 60 | |
| BCPP-2 | | 61 | | | 51 |
| BCPP-3 | | | 61 | | |
| BCPP-4 | | | | | 10 |
| (B) | | | | | |
| BCPP-7 | 6 | 6 | 6 | 8 | 10 |
| MFR (g/10 min) | 62 | 58 | 100 | 58 | 49 |
| Die swell | 1.81 | 1.89 | 1.88 | 1.99 | 2.1 |
| Number of granular structures (Number thereof/ 100 cm²) | 29 | 29 | 39 | — | 39 |

HPP-1, 2 and 3: Propylene homopolymers
BCCPP-1, 2, 3, 4 and 7: Ethylene-propylene block copolymers

TABLE 3

| | Comparative example 1 | Comparative example 2 | Comparative example 3 |
|---|---|---|---|
| Composition (wt %) | | | |
| (A) | | | |
| HPP-1 | 44 | | |
| HPP-2 | | | 10 |
| HPP-4 | | 43.4 | |
| BCPP-2 | | | 40 |
| BCPP-5 | 50 | | |
| BCPP-6 | | 38 | |
| (B) | | | |
| BCPP-7 | 6 | | |
| BCPP-8 | | 18.6 | |
| BCPP-9 | | | 50 |
| MFR (g/10 min) | 52 | 82 | 50.3 |
| Die swell | 1.95 | 1.51 | 1.42 |
| Number of granular structures (Number thereof/100 cm²) | 106 | — | 2500 or more |

TABLE 3-continued

| | Comparative example 1 | Comparative example 2 | Comparative example 3 |
|---|---|---|---|

HPP-1, 2 and 4: Propylene homopolymers
BCCPP-7, 8 and 9: Ethylene-propylene block copolymers

What is claimed is:

1. A polypropylene resin composition comprising:

95 to 80% by weight of a polypropylene resin (A) selected from the group consisting of a propylene-ethylene block copolymer (i) having a propylene homopolymer portion and propylene-ethylene random copolymer portion, and a mixture (ii) of the propylene-ethylene block copolymer (i) and a propylene homopolymer, wherein an intrinsic viscosity $[\eta]^A_P$ of the propylene homopolymer portion when the resin (A) is the copolymer (i), or of the mixture of the propylene homopolymer portion and the propylene homopolymer when the resin (A) is the mixture (ii), is not more than 1.3 dl/g, and an intrinsic viscosity $[\eta]^A_{EP}$ of the propylene-ethylene random copolymer portion is not more than 3.0 dl/g,; and 5 to 20% by weight of a propylene-ethylene block copolymer (B) composed of a propylene homopolymer portion and propylene-ethylene random copolymer portion wherein an intrinsic viscosity $[\eta]^B_{EP}$ of the propylene-ethylene random copolymer is 8.0 to 15 dl/g, and wherein the polypropylene resin composition has a melt flow rate (MFR) of from 5.0 to 150 g/10 min., and the sum of the (A) and (B) is 100% by weight.

2. The polypropylene resin composition according to claim 1, wherein the intrinsic viscosity $[\eta]^A_P$ of the propylene homopolymer portion is from 0.7 to 1.3 dl/g.

3. The polypropylene resin composition according to any one of claims 1 and 2, wherein the intrinsic viscosity $[\eta]^A_{EP}$ of the propylene-ethylene random copolymer portion is from 1.5 to 3.0 dl/g.

4. The polypropylene resin composition according to claim 1, wherein the intrinsic viscosity $[\eta]^B_{EP}$ of the propylene-ethylene random copolymer portion is from 9.0 to 13 dl/g.

5. The polypropylene resin composition according to claim 1, wherein the contents of the polypropylene resins (A) and (B) are 95 to 90% by weight and 5 to 10% by weight, respectively.

6. The polypropylene resin composition according to claim 1, wherein the melt flow rate (MFR) of the polypropylene resin composition is from 10 to 120 g/10 min.

7. The polypropylene resin composition according to claim 1, wherein the polypropylene resin (A) is obtained by a continuous gas phase polymerization process.

8. The polypropylene resin composition according to claim 1, wherein the die swell of the polypropylene resin composition is not less than 1.6.

9. A molded article comprising the polypropylene resin composition of claim 1.

* * * * *